United States Patent
Matsuda et al.

(10) Patent No.: US 8,405,854 B2
(45) Date of Patent: Mar. 26, 2013

(54) MONITORING DEVICE, INFORMATION PROCESSING SYSTEM AND COMPUTER READABLE MEDIUM FOR TROUBLE PREDICTION

(75) Inventors: Noriyuki Matsuda, Ebina (JP); Masayasu Takano, Ebina (JP); Akiko Seta, Ebina (JP); Koji Adachi, Ashigarakami-gun (JP); Kaoru Yasukawa, Ashigarakami-gun (JP); Tetsuichi Satonaga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 824 days.

(21) Appl. No.: 12/560,003

(22) Filed: Sep. 15, 2009

(65) Prior Publication Data

US 2010/0225961 A1 Sep. 9, 2010

(30) Foreign Application Priority Data

Mar. 3, 2009 (JP) ................................ 2009-049467

(51) Int. Cl.
*G06F 3/12* (2006.01)
*G06K 15/00* (2006.01)

(52) U.S. Cl. ..................................... 358/1.15; 358/1.14

(58) Field of Classification Search ................... 358/1.1, 358/1.9, 1.14, 1.15, 1.18; 714/2, 25, 44, 714/47, 48, 724; 399/9, 350
See application file for complete search history.

(56) References Cited

U.S. PATENT DOCUMENTS

| | | | |
|---|---|---|---|
| 5,923,834 A * | 7/1999 | Thieret et al. | 714/25 |
| 6,519,552 B1 * | 2/2003 | Sampath et al. | 702/183 |
| 7,840,517 B2 * | 11/2010 | Morimura et al. | 706/47 |
| 7,853,431 B2 * | 12/2010 | Samardzija et al. | 702/179 |
| 8,082,323 B2 * | 12/2011 | Yamaguchi | 709/218 |
| 8,145,955 B2 * | 3/2012 | Satonaga et al. | 714/48 |
| 2004/0181712 A1 | 9/2004 | Taniguchi et al. | |
| 2005/0281596 A1 * | 12/2005 | Nakagawa et al. | 399/350 |
| 2009/0034990 A1 * | 2/2009 | Nakazato et al. | 399/9 |

FOREIGN PATENT DOCUMENTS

| | | |
|---|---|---|
| JP | 2004-213618 A | 7/2004 |
| JP | 2007-328641 A | 12/2007 |

OTHER PUBLICATIONS

Tetsuichi Satonaga; et al.; "Monitoring Apparatus, Information Processing System, Monitoring Method and Computer Readable Medium"; filed Sep. 15, 2009; U.S. Appl. No. 12/559,911.

* cited by examiner

*Primary Examiner* — Gabriel Garcia
(74) *Attorney, Agent, or Firm* — Sughrue Mion, PLLC

(57) ABSTRACT

A monitoring device includes: a receiving unit that receives information including first use mode information transmitted from a first information processing device; a memory unit that stores the received first use mode information; a creating unit that creates, when the receiving unit receives trouble information together with the first use mode information, a trouble prediction formula corresponding to the trouble information using second use mode information of a second information processing device in which the same trouble as that indicated in the trouble information has occurred; a storing unit that stores the created trouble prediction formula; and a determining unit that determines, when the receiving unit receives third use mode information of a third information processing device, whether or not a trouble in the third information processing device occurs in a high probability based on the stored trouble prediction formula and the received third use mode information.

6 Claims, 12 Drawing Sheets

FIG. 3

| DEVICE ID 301 | TROUBLE INFORMATION 302 | COLOR PRINTING NUMBER 303 | MONOCHROME PRINTING NUMBER 304 | DRUM CYCLE NUMBER 305 |
|---|---|---|---|---|
| 1114741 | AAA | 152 | 10221 | 20584 |
| 1874119 | AAA | 2274 | 5684 | 16334 |
| 2257412 | AAA | 1589 | 30994 | 71400 |
| 1988741 | BBB | 104 | 8554 | 15287 |
| ... | ... | ... | ... | ... |
| 2336471 | ZZZ | 3881 | 101221 | 257510 |
| M/C-1 | — | 125 | 7654 | 13658 |
| ... | ... | ... | ... | ... |
| M/C-10 | — | 750 | 11337 | 27510 |

FIG. 4

| TROUBLE INFORMATION | DEVICE ID | MONOCHROME PRINTING NUMBER (X) | DRUM CYCLE NUMBER (Y) |
|---|---|---|---|
| 401 | 402 | 403 | 404 |
| AAA | 1114741 | 10221 | 20584 |
| AAA | 1874119 | 5684 | 16334 |
| AAA | 2257412 | 30994 | 71400 |
| — | M/C-1 | 7654 | 13658 |
| — | ... | ... | ... |
| — | M/C-10 | 11337 | 27510 |

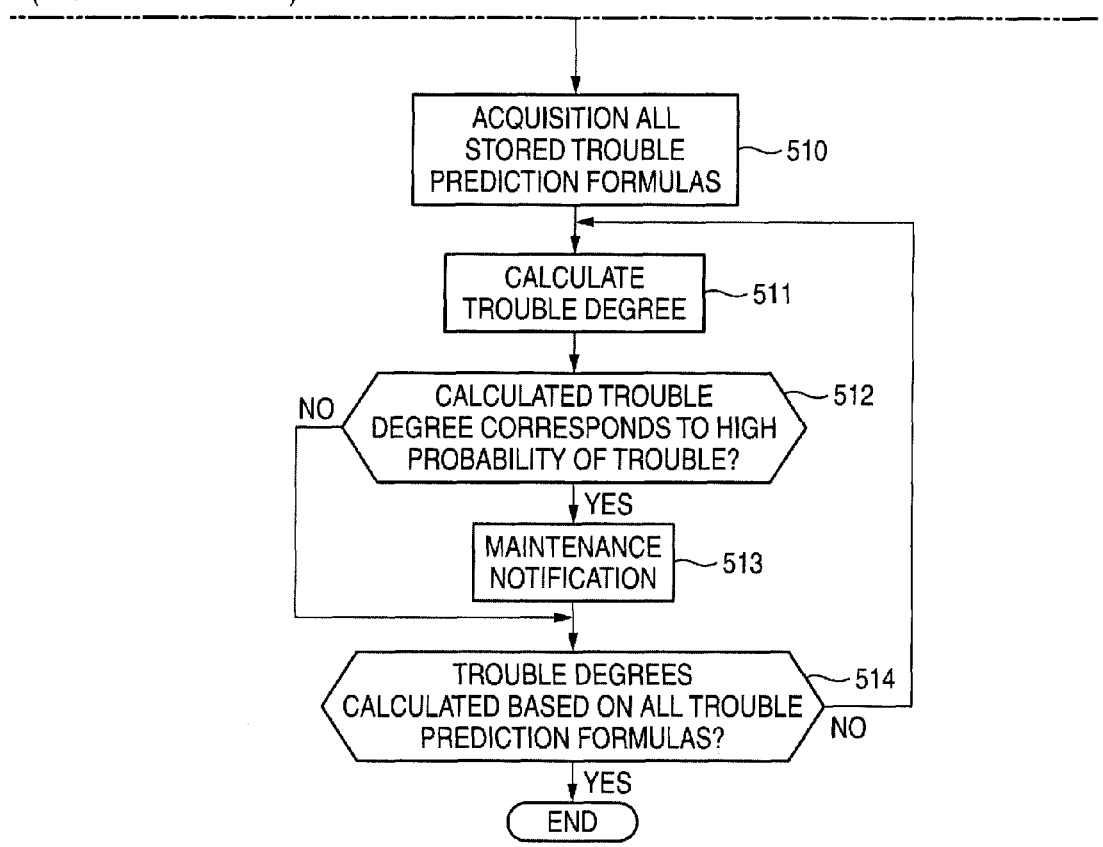

FIG. 7

| DEVICE ID 701 | TROUBLE INFORMATION 702 | CAUSE COMPONENT 703 | DEVICE INSTALLATION OR COMPONENT EXCHANGE DATE 704 | COLOR PRINTING NUMBER 705 | MONOCHROME PRINTING NUMBER 706 | DRUM CYCLE NUMBER 707 | TROUBLE OCCURRENCE DATE 708 |
|---|---|---|---|---|---|---|---|
| 1114741 | AAA | Cont PWBA | 2007/01/10 | 152 | 10221 | 20584 | 2008/03/08 |
| 1874119 | AAA | Cont PWBA | 2007/04/01 | 2274 | 5684 | 16334 | 2008/03/05 |
| 2257412 | AAA | Cont PWBA | 2006/12/10 | 1589 | 30994 | 71400 | 2008/03/05 |
| 1988741 | BBB | MCU PWBA | 2007/08/29 | 104 | 8554 | 15287 | 2007/12/5 |
| ⋮ | ⋮ | ⋮ | ⋮ | ⋮ | ⋮ | ⋮ | ⋮ |
| 2336471 | ZZZ | PICKUP ROLLER | 2007/04/11 | 3881 | 101221 | 257510 | 2008/03/08 |
| M/C-1 | — | — | 2006/04/01 | 125 | 7654 | 13658 | — |
| ⋮ | ⋮ | ⋮ | ⋮ | ⋮ | ⋮ | ⋮ | ⋮ |
| M/C-10 | — | — | 2006/04/01 | 750 | 11337 | 27510 | — |

FIG. 8

| CAUSE COMPONENT | DEVICE ID | MONOCHROME PRINTING NUMBER (X) | DRUM CYCLE NUMBER (Y) |
|---|---|---|---|
| Cont PWBA | 1114741 | 10221 | 20584 |
| Cont PWBA | 1874119 | 5684 | 16334 |
| Cont PWBA | 2257412 | 30994 | 71400 |
| — | M/C-1 | 7654 | 13658 |
| ... | ... | ... | ... |
| — | M/C-10 | 11337 | 27510 |

801 — CAUSE COMPONENT
802 — DEVICE ID
803 — MONOCHROME PRINTING NUMBER (X)
804 — DRUM CYCLE NUMBER (Y)

TROUBLE OCCURRED DERIVED FROM "CONT PWBA"

NORMALLY OPERATING

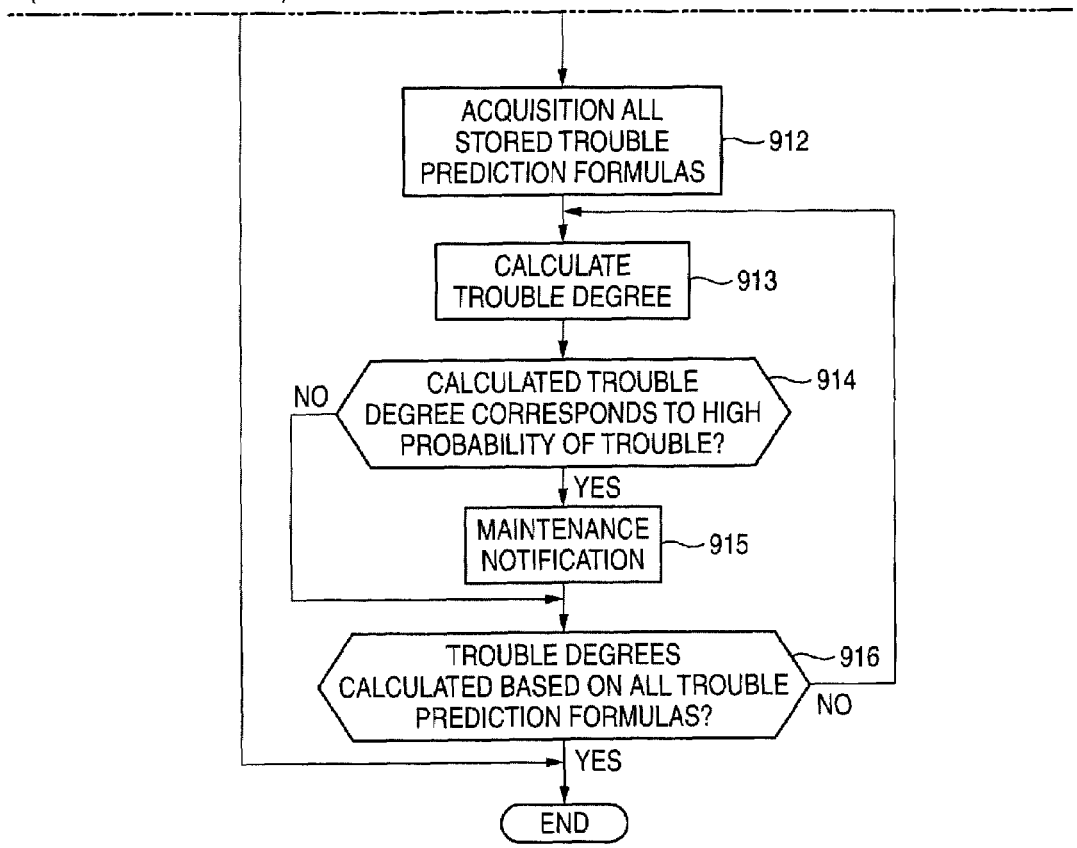

FIG. 10

| CAUSE COMPONENT | DEVICE ID | DEVICE INSTALLATION OR COMPONENT EXCHANGE DATE | COLOR PRINTING NUMBER | MONOCHROME PRINTING NUMBER | DRUM CYCLE NUMBER | TROUBLE OCCURRENCE DATE |
|---|---|---|---|---|---|---|
| Cont PWBA | 1114741 | 2007/01/10 | 152 | 10221 | 20584 | 2008/03/08 |
| Cont PWBA | 1874119 | 2007/04/01 | 2274 | 5684 | 16334 | 2008/03/05 |
| Cont PWBA | 2257412 | 2006/12/10 | 1589 | 30994 | 71400 | 2008/03/05 |
| ... | ... | ... | ... | ... | ... | ... |

1001　1002　1003　1004　1005　1006　1007

MONITORING DEVICE, INFORMATION PROCESSING SYSTEM AND COMPUTER READABLE MEDIUM FOR TROUBLE PREDICTION

CROSS-REFERENCE TO RELATED APPLICATIONS

This application is based on and claims priority under 35 USC 119 from Japanese Patent Application No. 2009-049467 filed on Mar. 3, 2009.

BACKGROUND

1. Field of the Invention

The present invention relates to a monitoring device, an information processing system and a computer readable medium.

2. Related Art

In products of a given kind of devices, various settings and adjustment made in accordance with the use mode depending upon the use environment, the use condition and the use frequency of each product are registered as setting information. In such a product, information about the use history is stored within the product so as to cope with a trouble or to be used for periodic maintenance.

In occurrence of a trouble, not only the information about the use history but also the setting information and the like are referred to for coping with the trouble. A technique in which restorative information or the like having been obtained in coping with a trouble is used for restoring the trouble occurring in another device has been disclosed.

SUMMARY

According to an aspect of the invention, a monitoring device includes: a receiving unit that receives information including first use mode information transmitted from a first information processing device; a memory unit that stores the first use mode information received by the receiving unit; a creating unit that creates, when the receiving unit receives trouble information together with the first use mode information, a trouble prediction formula corresponding to the trouble information using second use mode information of a second information processing device in which the same trouble as that indicated in the trouble information has occurred; a storing unit that stores the trouble prediction formula created by the creating unit; and a determining unit that determines, when the receiving unit receives third use mode information of a third information processing device, whether or not a trouble in the third information processing device occurs in a high probability based on the trouble prediction formula stored in the storing unit and the received third use mode information.

BRIEF DESCRIPTION OF THE DRAWINGS

Exemplary embodiment(s) of the present invention will be described in detail based on the following figures, wherein:

FIG. 3 is a diagram illustrating exemplary use mode information and trouble information corresponding to identification information of image formation devices;

FIG. 4 is a diagram illustrating use mode information of image formation devices having trouble information "AAA" and use mode information of image formation devices normally operating;

FIG. 7 is a diagram illustrating exemplary information including use mode information/trouble information and maintenance information corresponding to identification information of image formation devices;

FIG. 8 is a diagram illustrating use mode information of image formation devices corresponding to a cause component "Cont PWBA" and use mode information of image formation devices normally operating;

FIG. 10 is a diagram obtained by tabulating use mode information classified by cause component.

DETAILED DESCRIPTION

Exemplary embodiments of a monitoring device, an information processing system and a monitoring program according to the present invention will now be described in detail with reference to the accompanying drawings.

Figure 1:
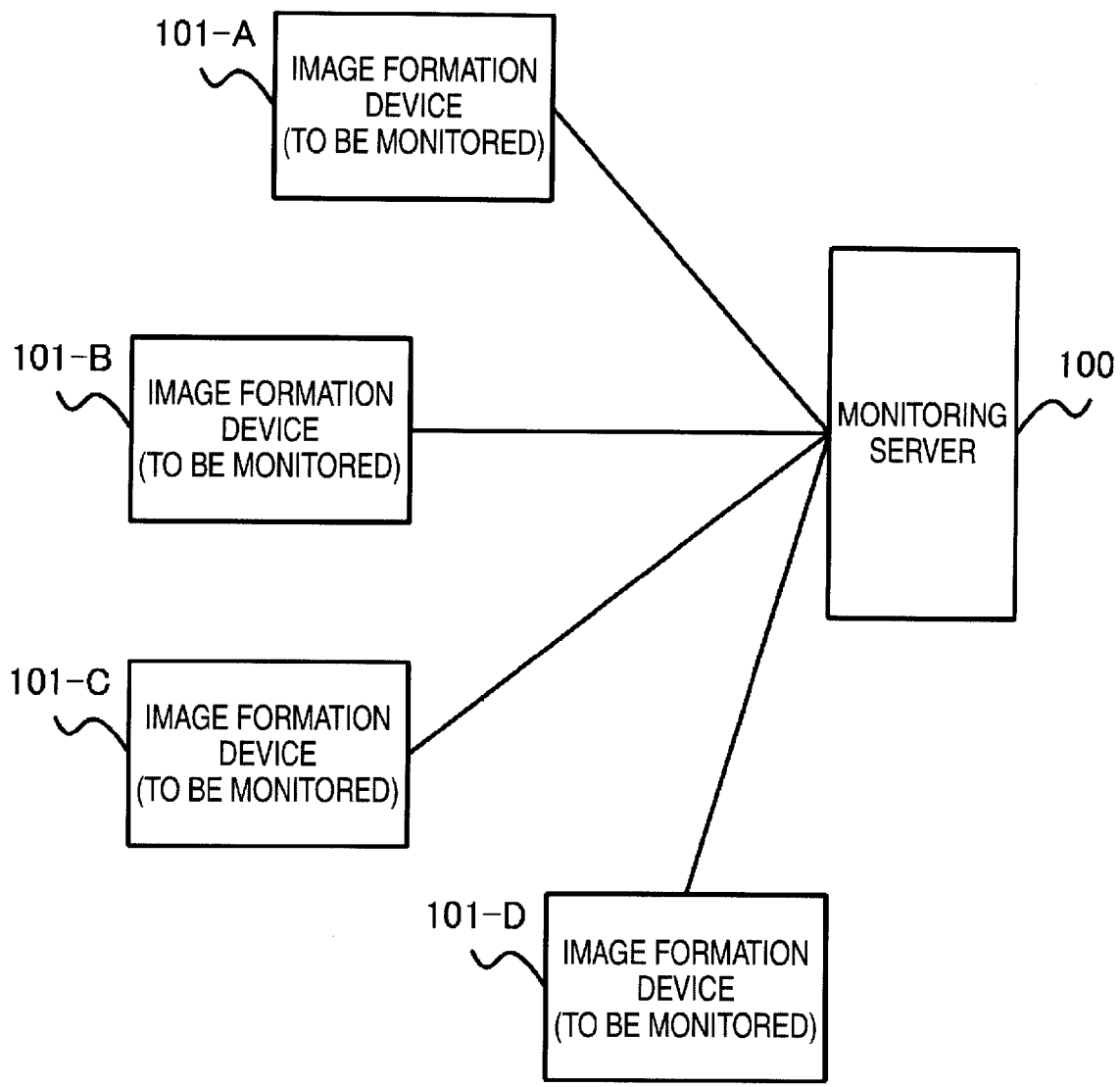
FIG. 1 is a diagram illustrating an exemplary configuration of an information processing system constructed by applying a monitoring device, an information processing system and a monitoring program according to an exemplary embodiment of the invention.

FIG. 1 is a diagram illustrating an exemplary configuration of an information processing system employing a monitoring device, an information processing system and a monitoring program according to an exemplary embodiment of the invention.

FIG. 1 illustrates a network structure in which image formation devices 101-A, 101-B, 101-C, 101-D, etc. (hereinafter generically mentioned as an "image formation device 101") described as an example of the information processing device and a monitoring sever 100 are connected through electric communication lines.

The monitoring server 100 monitors the operation state or the use state of an image forming function of the image formation device 101. It monitors the operation state or the use state by receiving, at appropriate timing from the image formation device 101, use mode information corresponding to how the image formation device 101 has been used.

The image formation device 101 is merely an example of a processing device monitored by the monitoring server 100 and executes image formation processing for image data. The processing device to be monitored is not limited to the image formation device 101 but may be another processing device (such as a network device).

The image formation device 101 creates use mode information through each image formation processing and the like, and thereafter, updates the use mode information, for example, every time image formation processing is performed. For example, when printing processing is performed as an example of the image formation processing, use mode information including various setting items such as the rotational speed of a sheet feeding roller and starting time of a printing function and set values set with respect to the setting items is created.

Furthermore, in addition to the information about the setting values, the use mode information may include information corresponding to how the image formation device 101 has been used (namely, the use situation), such as information about a number of color printings having been produced (color printing number) and a sheet size employed in printing. This use mode information is updated if necessary, for example, every time printing processing is performed.

The use mode information further includes identification information for identifying the image formation device.

The thus created use mode information is stored in the image formation device 101 and is transmitted to the monitoring server 100 at a prescribed time or in response to a transmission request made by the monitoring server 100.

It is noted that trouble information and the use mode information may be transmitted to the monitoring server 100 on the basis of a request made by an operator of the information formation device by, for example, pressing a transmission button provided in the image formation device. In this case, when the information is transmitted on the basis of a request made by an operator, an operation panel or the like to be used for inputting information about a type of trouble by the operator may be provided in the image formation device, so that the input information about the type of trouble can be transmitted to the monitoring server 100 as the trouble information (or in addition to the trouble information).

Furthermore, when a trouble (a failure) occurs in the image formation processing of the image formation device 101, trouble information about the trouble having occurred is created through a state monitoring function, and the created trouble information is transmitted to the monitoring server 100 together with the use mode information.

In the monitoring server 100, the use mode information of each image formation device is received from the image formation device 101 connected through the electric communication line, and the received use mode information is stored correspondingly to the image formation device.

Furthermore, when the use mode information is received together with the trouble information, the monitoring server 100 executes prescribed processing based on the trouble information by performing a multiple regression analysis or linear discrimination using use mode information of another image formation device of the same type (for example, the same model) as or corresponding to the image formation device where the trouble has occurred.

Exemplary Embodiment 1

Figure 2:
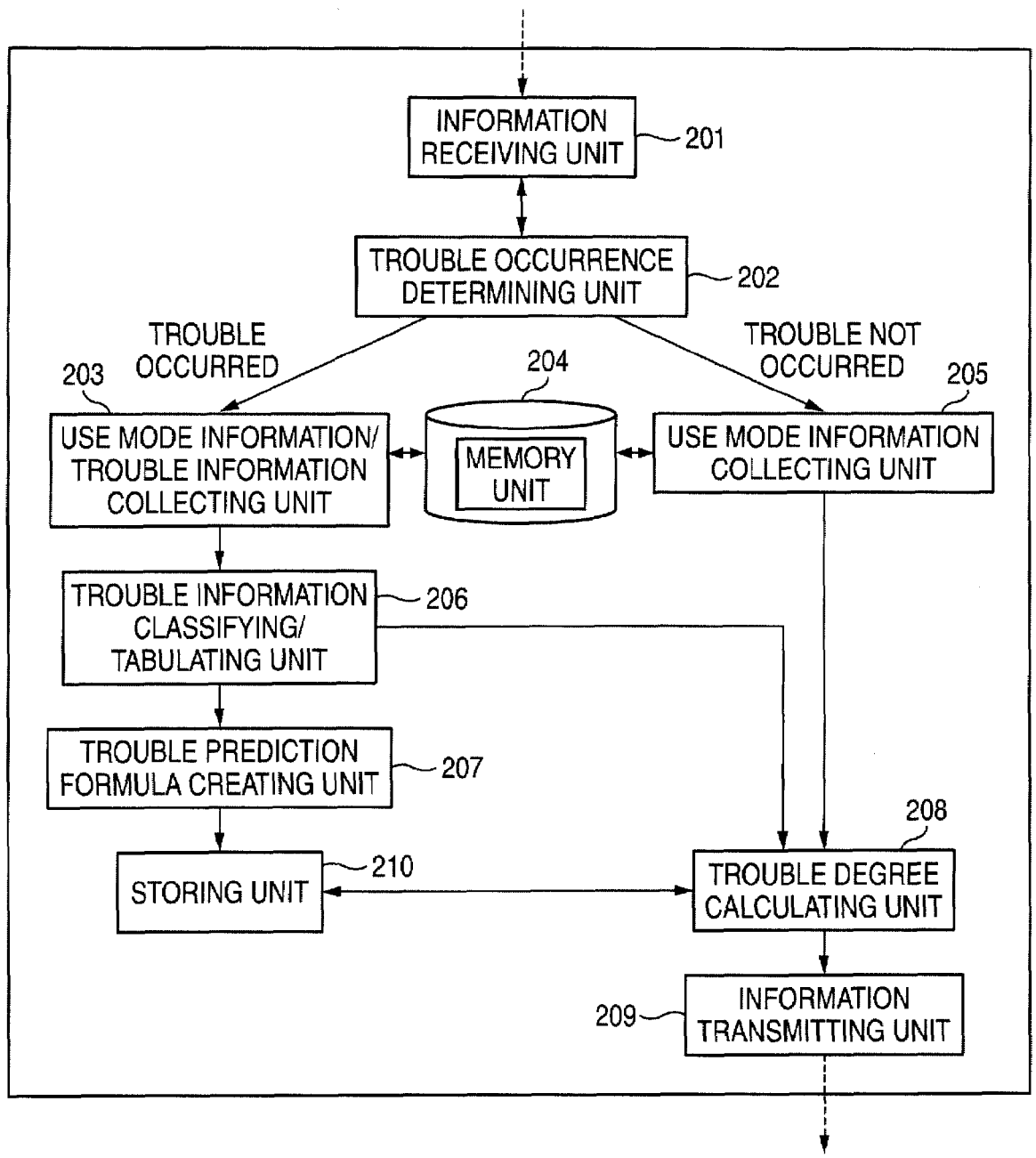
FIG. 2 is a diagram illustrating an exemplary detailed configuration of a monitoring server 100 used in the system of FIG. 1.

FIG. 2 is a diagram illustrating an exemplary detailed configuration of a monitoring server 100 used in the system as illustrated in FIG. 1.

In FIG. 2, the monitoring server 100 includes an information receiving unit 201, a trouble occurrence determining unit 202, a use mode information/trouble information collecting unit 203, a memory unit 204, a use mode information collecting unit 205, a trouble information classifying/tabulating unit 206, a trouble prediction formula creating unit 207, a trouble degree calculating unit 208, an information transmitting unit 209 and a storing unit 210.

The information receiving unit 201 receives use mode information, trouble information and the like from an image formation device 101. This information receiving unit 201 has a timer function so that a transmission request for use mode information or the like can be issued to each image formation device at a time precedently specified.

When use mode information or the like is received by the information receiving unit 201, the use mode information or the like thus received is sent to the trouble occurrence determining unit 202, which determines whether or not a trouble has occurred in the image formation device of the sender by determining whether or not the received information includes trouble information. Specifically, when the information receiving unit 201 receives use mode information alone, it is determined that any trouble has not occurred, and when it receives trouble information in addition to use mode information, it is determined that any trouble has occurred in the image formation device of the sender.

When it is determined that any trouble has not occurred, the use mode information is sent to the use mode information collecting unit 205. On the contrary, when it is determined that any trouble has occurred, the use mode information and the trouble information received together is sent to the use mode information/trouble information collecting unit 203.

The use mode information collecting unit 205 collects received use mode information and stores, in the memory unit 204, the use mode information correspondingly to identification information included in the use mode information. The use mode information collecting unit 205 acquisitions, from the memory unit 204, use mode information of an image formation device of the same type as the image formation device having sent the received use mode information and sends the acquisitioned information to the trouble degree calculating unit 208.

Furthermore, when the use mode information/trouble information collecting unit 203 receives the use mode information and the trouble information from the trouble occurrence determining unit 202, it stores, in the memory unit 204, these information correspondingly to the image formation device 101 of the sender. The use mode information/trouble information collecting unit 203 acquisitions, from the memory unit 204, use mode information and trouble information of an image formation device the same type as the image formation device having sent the received use mode information and trouble information and sends the acquisitioned information to the trouble information classifying/tabulating unit 206.

FIG. 3 illustrates exemplary use mode information and trouble information stored correspondingly to identification information of image formation devices in the memory unit 204 through the aforementioned processing.

A table of FIG. 3 includes a "device ID" item 301, a "trouble information" item 302, a "color printing number" item 303, a "monochrome printing number" item 304 and a "drum cycle number" item 305, and stores not only use mode information and trouble information of an image formation device having a trouble collected by the use mode information/trouble information collecting unit 203 but also use mode information of an image formation device normally operating (i.e., performing a normal operation) collected by the use mode information collecting unit 205.

For example, a record having the "device ID" item 301 of "1114741", the "trouble information" item 302 of "AAA", the "color printing number" item 303 of "152", the "monochrome printing number" item 304 of "10221" and the "drum cycle number" item 305 of "20584" corresponds to the use mode information of an image formation device having a device ID of "1114741", and indicates that the drum rotational number is "20584" after producing "152" color printings and "10221" monochrome printings and that a trouble "AAA" has occurred in this image formation device.

Furthermore, a record having the "device ID" item 301 of "M/C-1", the "trouble information" item 302 of "-", the "color printing number" item 303 of "125", the "monochrome printing number" item 304 of "7654" and the "drum cycle number" item 305 of "13658" indicates that an image formation device with a device ID of "M/C-1" is normally operating because "-" is listed as the "trouble information" item 302 and also indicates, as the use mode information of this image formation device, that the drum rotational number is "13658" after producing "125" color printings and "7654" monochrome printings.

The trouble information classifying/tabulating unit 206, which has received the use mode information and the trouble information as illustrated in FIG. 3 from the use mode information/trouble information collecting unit 203, classifies and tabulates, on the basis of the received use mode information and trouble information, use mode information of an image formation device in accordance with each trouble information and use mode information of an image formation device normally operating.

FIG. 4 illustrates the use mode information of image formation devices corresponding to the trouble information "AAA" and use mode information of image formation devices normally operating.

A table of FIG. 4 includes a "trouble information" item 401, a "device ID" item 402, a "monochrome printing number (X)" item 403 and a "drum cycle number (Y)" item 404.

For example, "AAA" is listed as the trouble information in the "trouble information" item 401, a device ID of a device having a trouble is listed in the "device ID" item 402, the number of monochrome printings having been produced is listed in the "monochrome printing number (X)" item 403, and the drum rotational number is listed in the "drum cycle number (Y)" item 404. At this point, the monochrome printing number is used as a parameter "X" and the drum rotational number is used as a parameter "Y".

As another example, "-" is listed in the "trouble information" item 401, "M/C-1" is listed as the device ID of an image formation device normally operating, "7654" is listed as the number of monochrome printings having been produced in the "monochrome printing number (X)" item 403, and "13658" is listed as the drum rotational number in the "drum cycle number (Y)" item 404.

When the trouble information classifying/tabulating unit 206 classifies and tabulates the use mode information of the image formation devices corresponding to the trouble information and the use mode information of the image formation devices normally operating as illustrated in FIG. 4, the resultant classified tabulation is sent to the trouble prediction formula creating unit 207.

Furthermore, the trouble information classifying/tabulating unit 206 issues a notification of completion of the classification/tabulation of the trouble information and requests the trouble degree calculating unit 208 to calculate a trouble degree (sometimes also designated as "trouble probability degree"). The processing for calculating a trouble degree performed by the trouble degree calculating unit 208 will be described in detail later.

The trouble prediction formula creating unit 207 creates a trouble prediction formula on the basis of the information as illustrated in FIG. 4 classified and tabulated by the trouble information classifying/tabulating unit 206.

The trouble prediction formula can be obtained as a linear discrimination function expressed by the following Formula 1:

$$Z = aX + bY + C \qquad \text{[Formula 1]}$$

In this Formula 1, a parameter Z indicates the trouble degree, and when the parameter Z has a value larger than "0 (zero)", it is discriminated that there is a probability of occurrence of a trouble. Alternatively, when the parameter Z has a value not more than "0 (zero)", it is discriminated that there is a high probability of a normal operation.

Furthermore, parameters X and Y are arguments used in the trouble prediction, and in the exemplary case illustrated in FIG. 4, the monochrome printing number is used as the parameter X and the drum cycle number is used as the parameter Y.

Accordingly, when the parameter Z has a value larger than "0 (zero)", it means that there is a probability of occurrence of a trouble "AAA".

It is noted that constants a and b used in Formula 1 are calculated in accordance with simultaneous equations of the following Formula 2 and Formula 3:

$$F = \frac{n_N\{a(\ddot{x}_N - \ddot{x}) + b(\ddot{y}_N - \ddot{y})\} + n_T\{a(\ddot{x}_T - \ddot{x}) + b(\ddot{y}_T - \ddot{y})\}}{(n-1)\{a^2 s_x^2 + 2abs_{xy} + b^2 s_y^2\}} \qquad \text{[Formula 2]}$$

$$\frac{\partial F}{\partial a} = 0, \quad \frac{\partial F}{\partial b} = 0 \qquad \text{[Formula 3]}$$

A subscript "T" of the parameters indicates a group of the use mode information of the image formation devices having the trouble listed in FIG. 4, and a subscript "N" indicates a group of the use mode information of the image formation devices normally operating listed in FIG. 4. Also, a parameter "$n_N$" indicates the number of devices normally operating listed in FIG. 4 and a parameter "$n_T$" indicates the number of devices having the trouble listed in FIG. 4.

Furthermore, a parameter "$X_T$" indicates an average of the numbers of monochrome printings having been produced in the image formation devices having the trouble, and the parameter "$Y_T$" indicates an average of the drum rotational numbers of the image formation devices having the trouble. Similarly, a parameter "$X_N$" indicates an average of the numbers of monochrome printings having been produced in the image formation devices normally operating, and the parameter "$Y_N$" indicates an average of the drum rotational numbers of the image formation devices normally operating.

Moreover, "S" indicates variance, "$S_X$" indicates the variance of the monochrome printing numbers, "$S_Y$" indicates the variance of the drum rotational numbers, and "$S_{XY}$" indicates covariance of the monochrome printing numbers and the drum rotational numbers.

Next, the numerical values listed in FIG. 4 are substituted in the following Formula 4 so as to calculate the parameters X and Y:

$$X = \frac{X_N + X_T}{2}, \quad Y = \frac{Y_N + Y_T}{2} \qquad \text{[Formula 4]}$$

When the parameters X and Y are thus calculated, the parameters X and Y and the constants a and b calculated in accordance with the simultaneous equations of Formula 2 and Formula 3 are substituted in Formula 1, so as to calculate the trouble degree (i.e., the parameter Z). Thus, the trouble prediction is performed.

Although the aforementioned trouble prediction formula is for use as a prediction formula for the trouble information "AAA", a trouble prediction formula is similarly created for another trouble information such as trouble information "BBB".

The trouble prediction formula creating unit 207 having created the trouble prediction formula for each trouble information in this manner stores the created trouble prediction formula in the storing unit 210.

The storing unit 210 stores a trouble prediction formula correspondingly to each trouble information.

Next, in the case where the use mode information acquisitioned from the memory unit 204 is sent from the use mode information collecting unit 205 or in the case where the trouble information classifying/tabulating unit 206 issues a request for calculating a trouble degree, the trouble degree calculating unit 208 calculates a trouble degree by using the aforementioned Formula 1. The trouble degree calculating unit 208 performs the trouble prediction with respect to each trouble information by using a corresponding trouble prediction formula stored in the storing unit 210.

The trouble degree calculating unit 208 transmits the result of the performed prediction to the information transmitting unit 209. Specifically, the trouble degree calculating unit 208 determines whether or not the parameter Z calculated by Formula 1 is "0 (zero)" or more with respect to any trouble information. When the parameter Z is "0 (zero)" or more with respect to any trouble information, the prediction result is sent to the information transmitting unit 209.

When the information transmitting unit 209 is informed that there is a probability of occurrence of the trouble, it provides the corresponding image information device with a notification of the probability and information to be used for avoiding the trouble (that is, a maintenance notification). In receiving the maintenance notification, the image formation device displays, on its own display, a message that there is a probability of occurrence of the trouble and that it is necessary for a person in charge to handle it.

Figure 5:
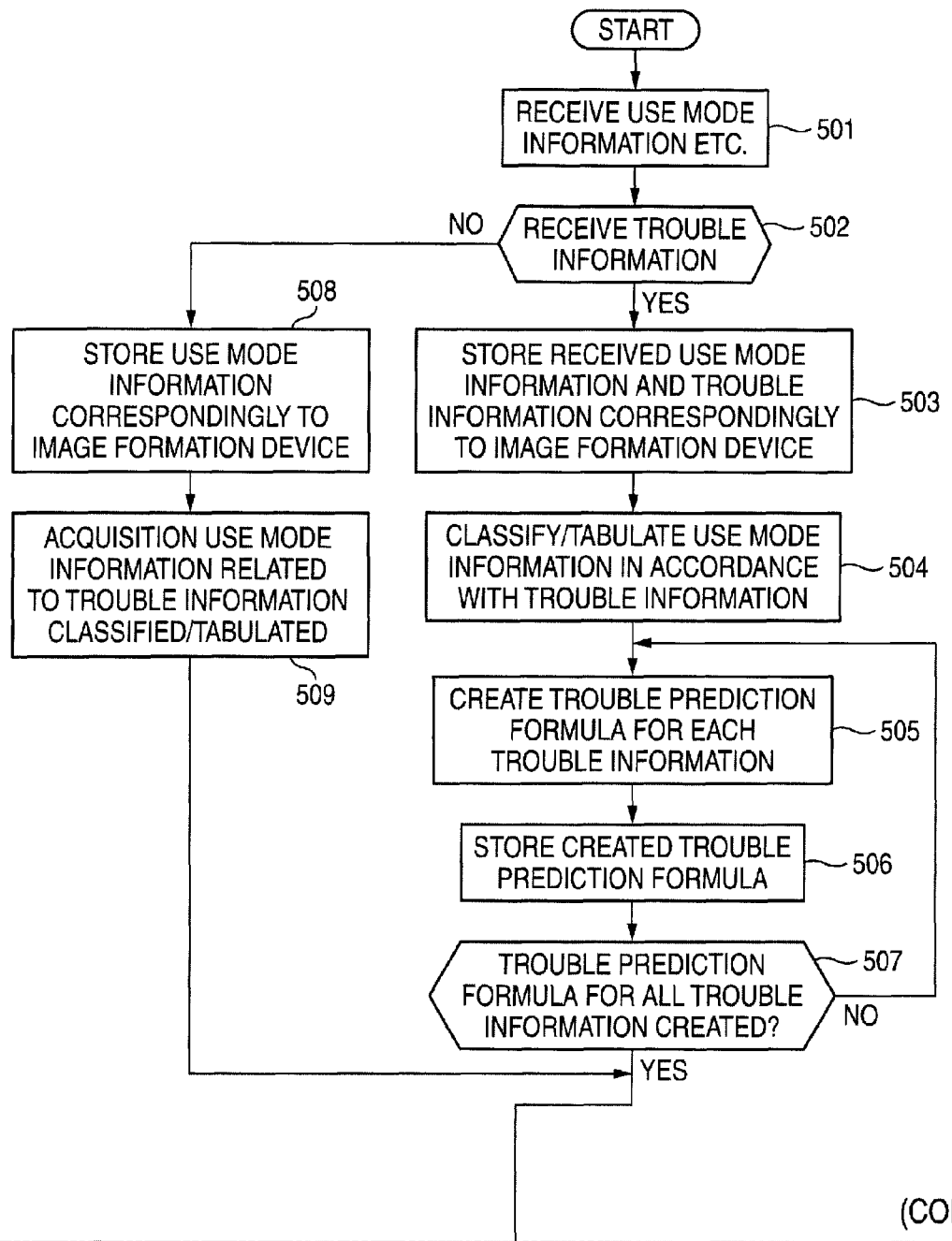
FIG. 5 is a flowchart illustrating detailed procedures in processing performed in the monitoring server included in the information processing system according to an exemplary embodiment of the invention.

FIG. 5 is a flowchart illustrating detailed procedures in processing performed in the monitoring server included in the information processing system of this exemplary embodiment.

In FIG. 5, when use mode information and the like is received from an image formation device (501), it is determined whether or not the received information is accompanied with trouble information corresponding to a content of a trouble having occurred in the image formation device of the sender (502).

When the trouble information is received (YES in 502), the received use mode information and trouble information are stored correspondingly to identification information identifying the image formation device (503).

Subsequently, use mode information related to trouble information of the same type as (or corresponding to) the received trouble information is classified/tabulated (504), and a trouble prediction formula for each trouble information is created (505). The created trouble prediction formula is stored correspondingly to the trouble information (506).

It is determined whether or not trouble prediction formulas have been created with respect to all trouble information (507), and when trouble prediction formulas have not been created with respect to all trouble information (NO in 507), a trouble prediction formula is created with respect to another trouble information (505), and the created trouble prediction formula is stored (506). Thus, trouble prediction formulas in consideration of the received trouble information are created.

On the other hand, when trouble prediction formulas have been created with respect to all trouble information (YES in 507), all the stored trouble prediction formulas are acquisitioned (510).

On the basis of the acquisitioned use mode information, a trouble degree is calculated by applying a trouble prediction formula (511). Furthermore, it is determined whether or not the calculated trouble degree corresponds to a high probability of occurrence of a trouble (512), and when it corresponds to a high probability (YES in 512), a maintenance notification is sent to the corresponding image formation device (513).

Then, it is determined whether or not trouble degrees have been calculated on the basis of all the trouble prediction formulas (514), and when the trouble degrees have not been calculated on the basis of all the trouble prediction formulas (NO in 514), procedures following the procedure for calculating a trouble degree on the basis of another trouble prediction formula (step 511) are repeatedly performed.

On the other hand, when trouble degrees have been calculated on the basis of all the trouble prediction formulas (YES in 514), the processing is completed.

Next, in the case where trouble information is not received but use mode information alone is received from the image formation device (NO in 502), the use mode information is stored correspondingly to identification information of the image formation device of the sender (508).

Subsequently, the use mode information related to the trouble information classified and tabulated in the procedure for creating the trouble prediction formulas is acquisitioned (509), and all the stored trouble prediction formulas are acquisitioned (510).

On the basis of the acquisitioned use mode information, a trouble degree is calculated by applying a trouble prediction formula (511). Furthermore, it is determined whether or not the calculated trouble degree corresponds to a high probability of occurrence of the trouble (512), and when it corresponds to a high probability (YES in 512), a maintenance notification is sent to the corresponding image formation device (513).

Then, it is determined whether or not trouble degrees have been calculated on the basis of all the trouble prediction formulas (514), and when the trouble degrees have not been calculated on the basis of all the trouble prediction formulas (NO in 514), procedures following the procedure for calculating a trouble degree on the basis of another trouble prediction formula (step 511) are repeatedly performed.

On the other hand, when trouble degrees have been calculated on the basis of all the trouble prediction formulas (YES in 514), the processing is completed.

Although all use mode information related to trouble information of the same type as (or corresponding to) the trouble information received from the image formation device are tabulated for creating trouble prediction formulas in the above description, information used for creating a trouble prediction formula is not limited to this.

For example, among all use mode information related to trouble information the same type as (or corresponding to) the received trouble information, merely one including specific information (for example, one including a "drum cycle number" falling within a specific range or one including a "monochrome printing number" close to that of the image formation device having the trouble) may be used for creating a trouble prediction formula.

Exemplary Embodiment 2

Figure 6:
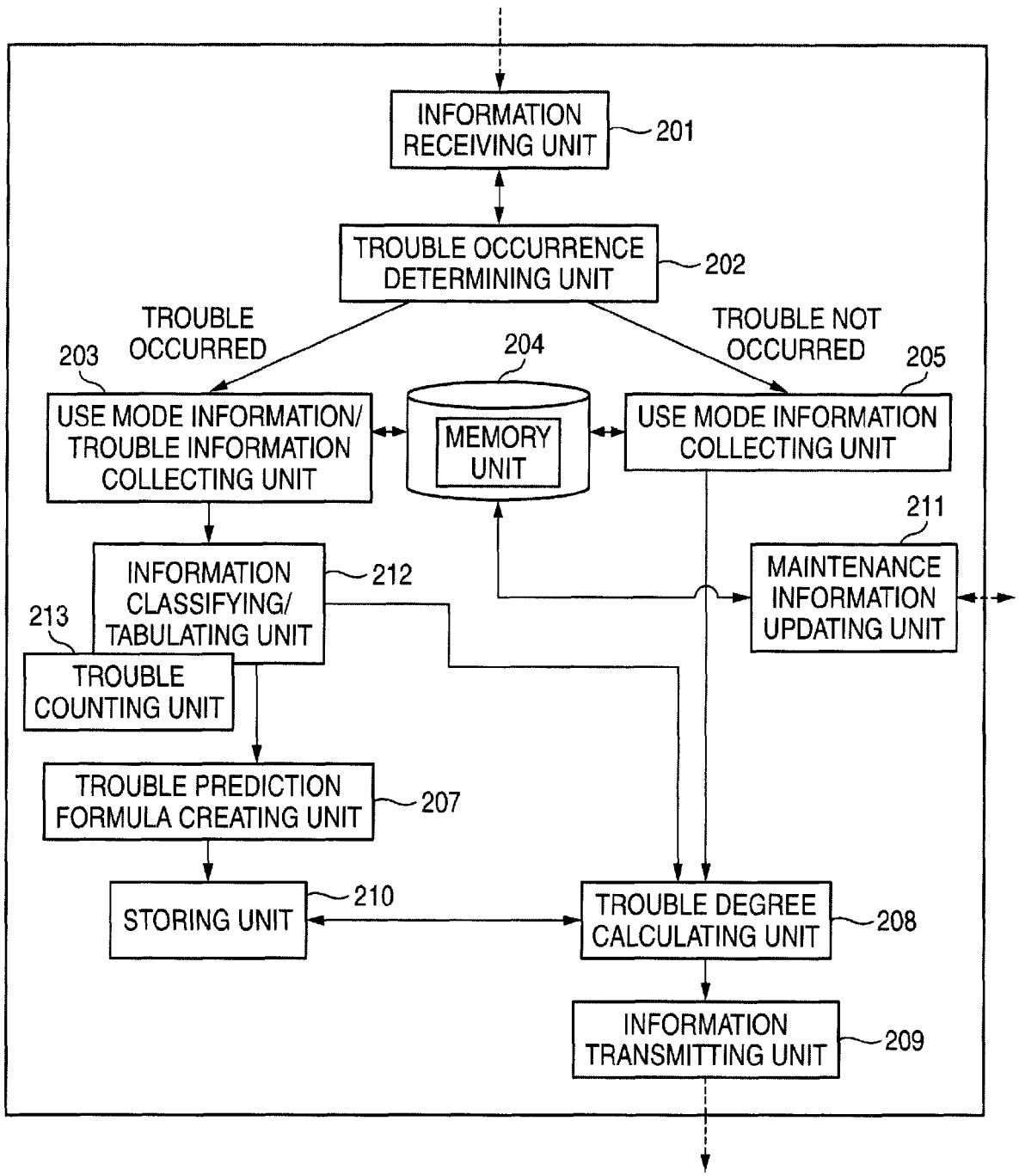
FIG. 6 is a diagram illustrating an exemplary detailed configuration of another monitoring server used in the system of FIG. 1.

FIG. 6 is a diagram illustrating an exemplary detailed configuration of another monitoring server 100 used in the system as illustrated in FIG. 1.

In FIG. 6, the monitoring server 100 includes an information receiving unit 201, a trouble occurrence determining unit 202, a use mode information/trouble information collecting unit 203, a memory unit 204, a use mode information collecting unit 205, a trouble prediction formula creating unit 207, a trouble degree calculating unit 208, an information transmitting unit 209, a storing unit 210, a maintenance information updating unit 211 and an information classifying/tabulating unit 212.

The information receiving unit 201 receives use mode information, trouble information and the like from an image formation device 101. The information receiving unit 201 has a timer function so that a transmission request for use mode information or the like can be issued to each image formation device at a time precedently specified.

When use mode information or the like is received by the information receiving unit 201, the use mode information or the like thus received is sent to the trouble occurrence determining unit 202, which determines whether or not a trouble has occurred in the image formation device of the sender by determining whether or not the received information includes trouble information. Specifically, when the information receiving unit 201 receives use mode information alone, it is determined that any trouble has not occurred, and when it receives trouble information in addition to use mode information, it is determined that any trouble has occurred in the image formation device of the sender.

It is assumed in this exemplary embodiment that trouble information transmitted from each image formation device includes information about a component of the image formation device corresponding to the cause of the trouble (i.e., a cause component). The information about a cause component may be obtained as a result of determination made on the cause of the trouble by the image formation device or may be input by an operator of the image formation device. Also, one trouble information may include information about a plurality of cause components.

When it is determined that any trouble has not occurred, the use mode information is sent to the use mode information collecting unit 205. On the contrary, when it is determined that any trouble has occurred, the use mode information and the trouble information received together is sent to the use mode information/trouble information collecting unit 203.

The use mode information collecting unit 205 collects received use mode information and stores, in the memory unit 204, the use mode information correspondingly to identification information included in the use mode information. The use mode information collecting unit 205 acquisitions, from the memory unit 204, use mode information of an image formation device of the same type as the image formation device having sent the received use mode information and sends the acquisitioned information to the trouble degree calculating unit 208.

Furthermore, when the use mode information/trouble information collecting unit 203 receives the use mode information and the trouble information from the trouble occurrence determining unit 202, it stores, in the memory unit 204, these information correspondingly to the image formation device 101 of the sender. The memory unit 204 stores not only the use mode information and the trouble information but also maintenance information updated by the maintenance information updating unit 211.

At this point, the maintenance information stored in the memory unit 204 is assumed to include, for example, information about a time when the image formation device was installed and information about a time when a component was exchanged (namely, information about a time period when a component has been used in the image formation device).

Next, the use mode information/trouble information collecting unit 203 acquisitions, from the memory unit 204, use mode information and trouble information and maintenance information of an image formation device the same type as the image formation device having sent the received use mode information and trouble information and sends the acquisitioned information to the trouble information classifying/tabulating unit 212.

FIG. 7 illustrates exemplary information including use mode information and trouble information corresponding to the identification information of an image formation device stored in the memory unit 204 and maintenance information updated by the maintenance information updating unit 211 obtained through the aforementioned procedures.

A table of FIG. 7 includes a "device ID" item 701, a "trouble information" item 702, a "cause component" item 703, a "device installation or component exchange date" item 704, a "color printing number" item 705, a "monochrome printing number" item 706, a "drum cycle number" item 707 and a "trouble occurrence date" item 708 (among which the "trouble occurrence date" may be obtained, for example, on the basis of the time when the trouble information was received, and the image formation device may be configured so that trouble information can include information about a time of occurrence of a trouble). Moreover, the table includes not only the use mode information and trouble information of an image formation device having a trouble collected by the use mode information/trouble information collecting unit 203 but also use mode information of an image formation device normally operating collected by the use mode information collecting unit 205 and maintenance information updated by the maintenance information updating unit 211.

For example, a record having the "device ID" item 701 of "1114741", the "trouble information" item 702 of "AAA", the "cause component" item 703 of "Cont PWBA", the "device installation or component exchange date" item 704 of "2007/01/10", the "color printing number" item 705 of "152", the "monochrome printing number" item 706 of "10221", the "drum cycle number" item 707 of "20584" and the "trouble occurrence date" item 708 of "2008/03/08" corresponds to the use mode information of an image formation device with the device ID of "1114741" indicating that the drum rotational number is "20584" after producing "152" color printings and "10221" monochrome printings, and further indicates that the trouble of "AAA" occurred in this image formation device on "2008/03/08", that the cause of the trouble is a component of "Cont PWBA" indicated by the information of the cause component and that this component has been used since "2007/01/10".

Furthermore, a record having the "device ID" item 701 of "M/C-1", the "trouble information" item 702 of "-", the "cause component" item 703 of "-", the "device installation or component exchange date" item 704 of "2006/04/01", the "color printing number" item 705 of "125", the "monochrome printing number" item 706 of "7654", the "drum cycle number" item 707 of "13658" and the "trouble occurrence date" item 708 of "-" corresponds to the use mode information of an image formation device with the device ID of "M/C-1" normally operating, and indicates that the drum rotational number is "13658" after producing "125" color printings and "7654" monochrome printings, and further indicates that no component exchange has been performed in response to occurrence of a trouble other than general exchange of expendable supplies since "2006/04/01" when the image formation device was installed.

The information classifying/tabulating unit 212 having received the information as illustrated in FIG. 7 classifies and tabulates, in accordance with each cause component included in the trouble information, use mode information of an image formation device having a trouble derived from the component and use mode information of an image formation device normally operating. FIG. 8 illustrates the result of the tabulation.

FIG. 8 illustrates use mode information of image formation devices in which the trouble has occurred due to the component "Cont PWBA" and use mode information of image formation devices normally operating although the component "Cont PWBA" is used therein.

A table of FIG. 8 includes a "cause component" item 801, a "device ID" item 802, a "monochrome printing number (X)" item 803 and a "drum cycle number (Y)" item 804.

For example, "Cont PWBA" is listed as a component exchanged as a cause of the trouble in the "cause component" item 801, a device ID having the trouble is listed in the "device ID" item 802, the number of monochrome printings having been produced is listed in the "monochrome printing number (X)" item 803 and the drum rotational number is listed in the "drum cycle number (Y)" item 804. At this point, it is assumed that the number of monochrome printings having been produced is used as a parameter "X" and that the drum rotational number is used as a parameter "Y".

As another example, "-" is listed in the "cause component" item 801, "M/C-1" is listed as a device ID of an image formation device normally operating in the "device ID" item 802, "7654" is listed as the number of monochrome printings having been produced in the "monochrome printing number (X)" item 803 and "13658" is listed as the drum rotational number in the "drum cycle number (Y)" item 804.

The information classifying/tabulating unit 212 classifies and tabulates use mode information of image formation devices in which a trouble has occurred due to a given component and use mode information of image formation devices normally operating as illustrated in FIG. 8, and the result of the classified tabulation is sent to the trouble prediction formula creating unit 207.

Furthermore, the information classifying/tabulating unit 212 issues a notification of completion of the classification/tabulation and requests the trouble degree calculating unit 208 to calculate a trouble degree. The information classifying/tabulating unit 212 includes a trouble counting unit 213, and the trouble counting unit 213 counts the number of occurrences of all troubles and the number of occurrences of each trouble.

The number of occurrences of each trouble is thus counted by the trouble counting unit 213, and when the counted number of occurrences reaches a given number, a calculation request for a trouble degree is issued to the trouble degree calculating unit 208. When the number of occurrences at which a calculation request for a trouble degree is issued to the trouble degree calculating unit 208 (namely, the aforementioned given number) is set to "0 (zero)", a calculation request for a trouble degree is issued regardless of the number of occurrences.

The processing for calculating a trouble degree by the trouble degree calculating unit 208 will be described in detail later.

The trouble prediction formula creating unit 207 creates a trouble prediction formula on the basis of information as illustrated in FIG. 8 classified/tabulated by the information classifying/tabulating unit 212.

The trouble prediction formula can be obtained as a linear discrimination function as expressed by the following Formula 1:

$$Z=aX+bY+C \qquad \text{[Formula 1]}$$

In this Formula 1, a parameter Z indicates the trouble degree, and when the parameter Z has a value larger than "0 (zero)", it is discriminated that there is a probability of occurrence of a trouble. Alternatively, when the parameter Z has a value not more than "0 (zero)", it is discriminated that there is a high probability of a normal operation.

Furthermore, parameters X and Y are arguments used in the trouble prediction, and in the exemplary case illustrated in FIG. 8, the monochrome printing number is used as the parameter X and the drum cycle number is used as the parameter Y.

Accordingly, when the parameter Z has a value larger than "0 (zero)", it means that there is a probability of occurrence of a trouble "AAA".

It is noted that constants a and b used in Formula 1 are calculated in accordance with simultaneous equations of the following Formula 2 and Formula 3:

$$F = \frac{n_N\{a(\ddot{x}_N - \ddot{x}) + b(\ddot{y}_N - \ddot{y})\} + n_T\{a(\ddot{x}_T - \ddot{x}) + b(\ddot{y}_T - \ddot{y})\}}{(n-1)\{a^2 s_x^2 + 2abs_{xy} + b^2 s_y^2\}} \qquad \text{[Formula 2]}$$

$$\frac{\partial F}{\partial a} = 0, \frac{\partial F}{\partial b} = 0 \qquad \text{[Formula 3]}$$

A subscript "T" of the parameters indicates a group of the use mode information of the image formation devices having the trouble listed in FIG. 8, and a subscript "N" indicates a group of the use mode information of the image formation devices normally operating listed in FIG. 8. Also, a parameter "$n_N$" indicates the number of devices normally operating listed in FIG. 8 and a parameter "$n_T$" indicates the number of devices having the trouble listed in FIG. 8.

Furthermore, a parameter "$X_T$" indicates an average of the numbers of monochrome printings having been produced in the image formation devices having the trouble, and the parameter "$Y_T$" indicates an average of the drum rotational numbers of the image formation devices having the trouble. Similarly, a parameter "$X_N$" indicates an average of the numbers of monochrome printings having been produced in the image formation devices normally operating, and the parameter "$Y_N$" indicates an average of the drum rotational numbers of the image formation devices normally operating.

Moreover, "S" indicates variance, "$S_X$" indicates the variance of the monochrome printing numbers, "$S_Y$" indicates the variance of the drum rotational numbers, and "$S_{XY}$" indicates covariance of the monochrome printing numbers and the drum rotational numbers.

Next, the numerical values listed in FIG. 8 are substituted in the following Formula 4 so as to calculate the parameters X and Y:

$$X = \frac{X_N + X_T}{2}, Y = \frac{Y_N + Y_T}{2} \qquad \text{[Formula 4]}$$

When the parameters X and Y are thus calculated, the parameters X and Y and the constants a and b calculated in accordance with the simultaneous equations of Formula 2 and Formula 3 are substituted in Formula 1, so as to calculate the trouble degree (i.e., the parameter Z). Thus, the trouble prediction is performed.

Although the aforementioned trouble prediction formula is for use as a prediction formula for the trouble information "AAA", a trouble prediction formula is similarly created for another trouble information such as trouble information "BBB".

Such a trouble prediction formula is created with respect to each cause component.

The trouble prediction formula creating unit 207 having created the trouble prediction formula with respect to each cause component in this manner stores the created trouble prediction formula in the storing unit 210.

In the storing unit 210, a trouble prediction formula is stored correspondingly to each trouble information.

Next, in the case where the use mode information acquisitioned from the memory unit 204 is sent from the use mode information collecting unit 205 or in the case where the trouble information classifying/tabulating unit 212 issues a request for calculating a trouble degree, the trouble degree calculating unit 208 calculates a trouble degree by using the aforementioned Formula 1. The trouble degree calculating unit 208 calculates a trouble degree of an image formation device with respect to each cause component by using a corresponding trouble prediction formula stored in the storing unit 210.

The prediction result thus obtained is transmitted to the information transmitting unit 209, and when the parameter Z of Formula 1 is "0 (zero)" or more, the prediction result is sent to the information transmitting unit 209.

When the information transmitting unit 209 is informed that there is a probability of occurrence of a trouble, it issues a maintenance notification to the corresponding image formation device.

In receiving the maintenance notification, the image formation device displays, on its own display, a message that there is a probability of occurrence of the trouble derived from the given component and that it is necessary for a person in charge to handle it.

Thereafter, when the maintenance is carried out by the person in charge, the date of carrying out the maintenance as well as maintenance information including an exchanged cause component and the like is separately transmitted by the person in charge using a computer to the monitoring server 100 as a notification of completion of the maintenance. Alternatively, the image formation device in which the maintenance has been carried out transmits a notification of completion of maintenance together with the maintenance information including an exchanged cause component and the like.

The maintenance information transmitted from an image formation device may include use mode information (such as color printing number) obtained at the time of exchange of a cause component (namely, at the start time of using a new component). In this manner, when the use mode information is received from the image formation device where the component has been exchanged, a monitoring server can grasp in which situation the exchanged (new) component is used (for example, it can grasp how many color printings are output after the exchange of the component by subtracting the color printing number included in the use mode information obtained at the time of exchanging the component from the color printing number included in the use mode information received after the exchange of the component), and a trouble prediction formula can be created by using this information.

The monitoring server 100 accepts the maintenance information by the maintenance information updating unit 211, so as to update maintenance information of the corresponding image formation device stored in the memory unit 204.

Specifically, the update is performed as follows:

Maintenance information stored in the memory unit 204 includes information for identifying an image formation device and information about a time of installation of the image formation device on the basis of, for example, information received from the image formation device or information input by an operator or the like when it was installed.

When maintenance information is accepted from an image formation device, information of an exchanged component and a start date of using the component (which is, in many cases, the same date as a date of accepting the maintenance information from the image formation device) are stored additionally to the maintenance information of the corresponding image formation device stored in the memory unit 204. In the case where the maintenance information sent from the image formation device includes use mode information obtained at the start of using the new component as described above, the use mode information is also additionally stored.

Although all use mode information related to trouble information having a cause component the same as (or corresponding to) that of the trouble information received from the image formation device is tabulated for creating a trouble prediction formula in the above description, information used for creating a trouble prediction formula is not limited to this. For example, among all use mode information related to trouble information having a cause component the same type as (or corresponding to) that of the received trouble information, merely one including specific information (for example, one including a "drum cycle number" falling within a specific range or one including a "monochrome printing number" close to that of the image formation device having the trouble) may be used for creating a trouble prediction formula.

Furthermore, although the trouble prediction formula created by the trouble prediction formula creating unit 207 is created by employing the discriminant analysis, another method (such as multiple regression analysis) may be employed for the creation.

FIG. 10 illustrates the result of classification/tabulation performed by the information classifying/tabulating unit 212 in this case.

FIG. 10 is a diagram illustrating tabulation of all use mode information classified in accordance with a given cause component, and includes a "cause component" item 1001, a "device ID" item 1002, a "device installation or component exchange date" item 1003, a "color printing number" item 1004, a "monochrome printing number" item 1005, a "drum cycle number" item 1006 and a "trouble occurrence date" item 1007.

A number of color printings, a number of monochrome printings and a drum cycle number listed in the "color number" item 1004, the "monochrome number" item 1005 and the "drum cycle number" item 1006 correspond to use mode information.

In the trouble prediction formula creating unit 207, the multiple regression analysis is performed by using the use mode information illustrated in FIG. 10 as an explanatory variable of the multiple regression analysis and a use period (of the component) calculated based on the "device installation or component exchange" item 1003 and the "trouble occurrence date" item 1007 as a response variable of the multiple regression analysis, and a trouble prediction formula is created by using the result of the multiple regression analysis so as to be stored in the storing unit 210.

The trouble degree calculating unit 208 calculates a trouble degree in accordance with the trouble prediction formula obtained by using the result of the multiple regression analysis.

Then, trouble prediction is performed on the basis of the calculated trouble degree.

Figure 9:
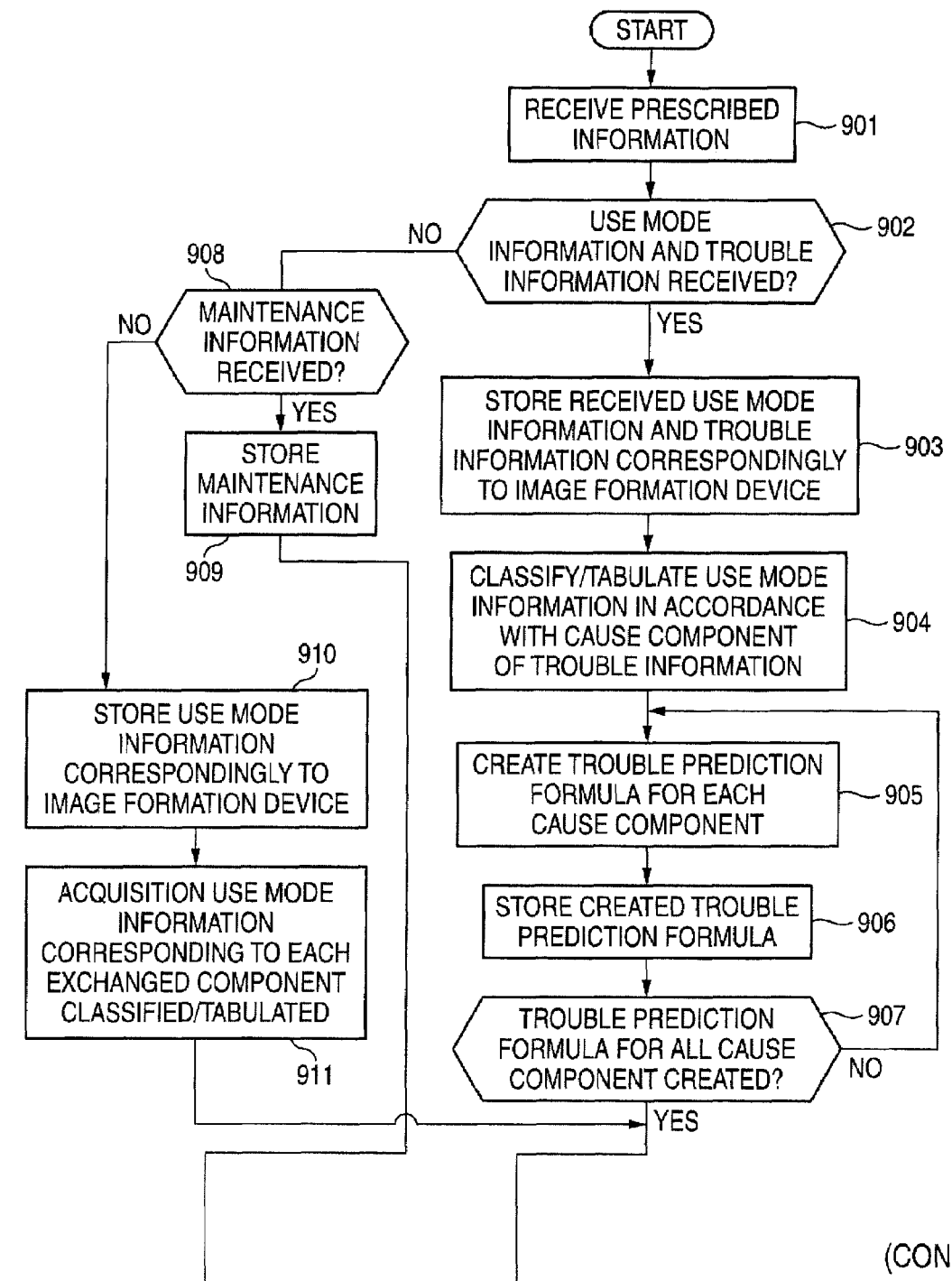
FIG. 9 is a flowchart illustrating detailed procedures in processing performed in the monitoring server included in the information processing system according to an exemplary embodiment of the invention.

FIG. 9 is a flowchart illustrating detailed procedures in processing performed in the monitoring server included in the information processing system of this exemplary embodiment.

In FIG. 9, when use mode information and the like is received from an image formation device (901), it is determined whether or not the received information is accompanied with trouble information corresponding to a content of a trouble having occurred in the image formation device of the sender (902).

When the trouble information is received (YES in 902), the received use mode information and trouble information are stored correspondingly to identification information identifying the image formation device (903). Specifically, the use mode information and the trouble information are stored correspondingly to the identification information.

Subsequently, use mode information related to a cause component the same type as (or corresponding to) that of the received trouble information and use mode information of image formation devices normally operating are classified/tabulated (904), and a trouble prediction formula for each cause component is created (905). The created trouble prediction formula is stored correspondingly to the cause component (906).

It is determined whether or not trouble prediction formulas have been created with respect to all cause components (907), and when trouble prediction formulas have not been created with respect to all cause components (NO in 907), a trouble prediction formula is created with respect to another cause component (905), and the created trouble prediction formula is stored (906).

On the other hand, when trouble prediction formulas have been created with respect to all cause components (YES in 907), all the stored trouble prediction formulas are acquisitioned (912).

On the basis of the acquisitioned use mode information, a trouble degree is calculated by applying a trouble prediction formula (913). Furthermore, it is determined whether or not the calculated trouble degree corresponds to a high probability of occurrence of the trouble (914), and when it corresponds to a high probability (YES in 914), a maintenance notification is sent to the corresponding image formation device (915).

Then, it is determined whether or not trouble degrees have been calculated on the basis of all the trouble prediction formulas (916), and when the trouble degrees have not been calculated on the basis of all the trouble prediction formulas (NO in 916), procedures following the procedure for calculating a trouble degree on the basis of another trouble prediction formula (step 913) are repeatedly performed.

On the other hand, when trouble degrees have been calculated on the basis of all the trouble prediction formulas (YES in 916), the processing is completed.

Next, in the case where use mode information and trouble information are not received from the image formation device (NO in 902), it is determined whether or not maintenance information has been received (908). When the maintenance information has been received (YES in 908), information of a cause component included in the maintenance information is stored correspondingly to identification information of the image formation device having sent the maintenance information (namely, the maintenance information is updated in the memory unit 204) (909), and the processing is completed.

In the case where it is determined, in the procedure for determining whether or not maintenance information has been received, that the maintenance information has not been received but use mode information alone is received (NO in 908), the use mode information is stored correspondingly to the identification information of the image formation device having sent the use mode information (910).

Subsequently, use mode information related to the trouble information classified and tabulated in the procedure for creating the trouble prediction formula is acquisitioned (911), and all the stored trouble prediction formulas are acquisitioned (912).

On the basis of the received use mode information, a trouble degree is calculated by applying a trouble prediction formula (913). Furthermore, it is determined whether or not the calculated trouble degree corresponds to a high probability of occurrence of the trouble (914), and when it corresponds to a high probability of occurrence (YES in 914), a maintenance notification is sent to the corresponding image formation device (915).

Then, it is determined whether or not trouble degrees have been calculated on the basis of all the trouble prediction formulas (916), and when the trouble degrees have not been calculated on the basis of all the trouble prediction formulas (NO in 916), procedures following the procedure for calculating a trouble degree on the basis of another trouble prediction formula (step 913) are repeatedly performed.

On the other hand, when trouble degrees have been calculated on the basis of all the trouble prediction formulas (YES in 916), the processing is completed.

According to the present invention, the aforementioned operations can be executed in an information processing system having a communication function, or a program for realizing the aforementioned operations can be installed from a recording medium (such as a CD-ROM or a DVD-ROM) storing the program to a computer for executing the program, so as to construct the information processing system for executing the processing. In the computer used in the information processing system, a CPU (Central Processor Unit), a ROM (Read Only Memory), a RAM (Random Access Memory) and a hard disk are connected to one another through system buses. The CPU performs the processing in accordance with a program stored in the ROM or the hard disk with the RAM used as a work area.

Also, the medium used for supplying the program may be a communication medium (i.e., a medium for temporarily or fluidly storing the program like a communication line and a communication system). For example, the program may be put up on an electronic bulletin board (BBS: Bulletin Board Service) of a communication network to be delivered through a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A monitoring device comprising:
a receiving unit that receives information including first use mode information transmitted from a first information processing device;
a memory unit that stores the first use mode information received by the receiving unit;
a creating unit that creates, when the receiving unit receives trouble information together with the first use mode information, a trouble prediction formula corresponding to the trouble information using second use mode information of a second information processing device in which the same trouble as that indicated in the trouble information has occurred;
a storing unit that stores the trouble prediction formula created by the creating unit; and
a determining unit that determines, when the receiving unit receives third use mode information of a third information processing device, whether or not a trouble in the third information processing device occurs in a high probability based on the trouble prediction formula stored in the storing unit and the received third use mode information;
wherein the creating unit creates the trouble prediction formula corresponding to the trouble information through discriminant analysis by using the second use mode information of the second information processing device and fourth use mode information of a fourth information processing device which is operating with no trouble.

2. A monitoring device comprising:
a receiving unit that receives information including first use mode information from a first information processing device;
a memory unit that stores the first use mode information received by the receiving unit;
a creating unit that creates, when the receiving unit receives information about a component corresponding to a cause of a trouble together with the first use mode information, a trouble prediction formula corresponding to the component by using second use mode information of a second information processing device where a trouble derived from the component has occurred;
a storing unit that stores the trouble prediction formula created by the creating unit; and
a determining unit that determines, when the receiving unit receives third use mode information of a third information processing device, whether or not the trouble derived from the component occurs in the third information processing device in a high probability based on the trouble prediction formula stored in the storing unit and the received third use mode information;
wherein the memory unit stores information about a use period of the component, and
the creating unit creates the trouble prediction formula corresponding to the component through multiple regression analysis using the information about the use period of the component corresponding to the cause of the trouble as a response variable and using the second use mode information as an explanatory variable.

3. An information processing system comprising:
a plurality of information processing devices; and
a monitoring device, wherein
each of the information processing devices comprises:
a transmitting unit that transmits use mode information about its own use mode to the monitoring device and, when a trouble has occurred in the information processing device or an external instruction is accepted, transmits trouble information about the trouble having occurred in the information processing device together with the use mode information to the monitoring device, and
the monitoring device comprises:
a receiving unit that receives information including first use mode information transmitted from a first one of the information processing devices;
a memory unit that stores the first use mode information received by the receiving unit;
a creating unit that creates, when the receiving unit receives trouble information together with the first use mode information, a trouble prediction formula corresponding to the trouble information using second use mode information of a second one of the information processing devices, wherein the same trouble as that indicated in the trouble information has occurred in the second one;
a storing unit that stores the trouble prediction formula created by the creating unit; and
a determining unit that determines, when the receiving unit receives third use mode information of a third one of the information processing devices, whether or not a trouble in the third one occurs in a high probability based on the trouble prediction formula stored in the storing unit and the received third use mode information;
wherein the creating unit creates the trouble prediction formula corresponding to the trouble information through discriminant analysis by using the second use mode information of the second information processing device and fourth use mode information of a fourth information processing device which is operating with no trouble.

4. An information processing system comprising:
a plurality of information processing devices; and
a monitoring device, wherein
each of the information processing devices comprises:
a transmitting unit that transmits use mode information about its own use mode to the monitoring device and, when a trouble has occurred in the information processing device or an external instruction is accepted, transmits information about a component corresponding to a cause of the trouble having occurred in the information processing device together with the use mode information to the monitoring device, and
the monitoring device includes:
a receiving unit that receives information including first use mode information from a first one of the information processing devices;
a memory unit that stores the first use mode information received by the receiving unit;
a creating unit that creates, when the receiving unit receives information about a component corresponding to a cause of a trouble together with the first use mode information, a trouble prediction formula corresponding to the component by using second use mode information of a second one of the information processing devices where a trouble derived from the component has occurred;
a storing unit that stores the trouble prediction formula created by the creating unit; and
a determining unit that determines, when the receiving unit receives third use mode information of a third one of the information processing devices, whether or not the trouble derived from the component occurs in the third information processing device in a high probability based on the trouble prediction formula stored in the storing unit and the received third use mode information;

wherein the memory unit stores information about a use period of the component, and the creating unit creates the trouble prediction formula corresponding to the component through multiple regression analysis using the information about the use period of the component corresponding to the cause of the trouble as a response variable and using the second use mode information as an explanatory variable.

5. A non-transitory computer readable medium storing a program causing a computer to execute a process for monitoring information processing devices, the process comprising:

receiving information including first use mode information transmitted from a first information processing device;

storing the received first use mode information;

creating, when trouble information together with the first use mode information is received, a trouble prediction formula corresponding to the trouble information using second use mode information of a second information processing device in which the same trouble as that indicated in the trouble information has occurred, the trouble prediction formula corresponding to the trouble information is created through discriminant analysis by using the second use mode information of the second information processing device and fourth use mode information of a fourth information processing device which is operating with no trouble;

storing the created trouble prediction formula; and determining, when third use mode information of a third information processing device is received, whether or not a trouble in the third information processing device occurs in a high probability based on the stored trouble prediction formula stored and the received third use mode information.

6. A non-transitory computer readable medium storing a program causing a computer to execute a process for monitoring information processing devices, the process comprising:

receiving information including first use mode information from a first information processing device;

storing the received first use mode information and information about a user period of the component;

creating, when information about a component corresponding to a cause of a trouble together with the first use mode information is received, a trouble prediction formula corresponding to the component by using second use mode information of a second information processing device where a trouble derived from the component has occurred, the trouble prediction formula is created through multiple regression analysis using the information about the use period of the component corresponding to the cause of the trouble as a response variable and using the second use mode information as an explanatory variable;

storing the created trouble prediction formula; and determining, when third use mode information of a third information processing device is received, whether or not the trouble derived from the component occurs in the third information processing device in a high probability based on the stored trouble prediction formula and the received third use mode information.

* * * * *